US008982179B2

(12) United States Patent
North et al.

(10) Patent No.: US 8,982,179 B2
(45) Date of Patent: Mar. 17, 2015

(54) APPARATUS AND METHOD FOR MODIFICATION OF TELECOMMUNICATION VIDEO CONTENT

(75) Inventors: Stephen C. North, Lebanon, NJ (US); John F. Murray, Denville, NJ (US); Christopher W. Rice, Parsippany, NJ (US); Shankar Krishnan, Chatham, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 384 days.

(21) Appl. No.: 13/527,774

(22) Filed: Jun. 20, 2012

(65) Prior Publication Data

US 2013/0342629 A1 Dec. 26, 2013

(51) Int. Cl.
*H04N 7/14* (2006.01)

(52) U.S. Cl.
USPC .................. 348/14.15; 348/14.08; 348/14.13; 348/14.14

(58) Field of Classification Search
USPC ..................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 5,781,198 A * | 7/1998 | Korn | 345/634 |
| 6,912,313 B2 * | 6/2005 | Li | 382/219 |
| 7,227,567 B1 * | 6/2007 | Beck et al. | 348/14.07 |
| 7,440,615 B2 | 10/2008 | Gong et al. | |
| 7,720,283 B2 * | 5/2010 | Sun et al. | 382/173 |
| 7,826,644 B2 * | 11/2010 | Sharma et al. | 382/118 |
| 8,139,142 B2 * | 3/2012 | Bamji et al. | 348/348 |
| 2002/0132610 A1 * | 9/2002 | Chaplin et al. | 455/414 |
| 2003/0118173 A1 * | 6/2003 | Bluestein et al. | 379/265.02 |
| 2007/0188596 A1 * | 8/2007 | Kenoyer | 348/14.08 |
| 2007/0286520 A1 * | 12/2007 | Zhang et al. | 382/264 |
| 2008/0030621 A1 * | 2/2008 | Ciudad et al. | 348/586 |
| 2008/0077953 A1 * | 3/2008 | Fernandez et al. | 725/32 |
| 2009/0315915 A1 * | 12/2009 | Dunn et al. | 345/632 |
| 2010/0225737 A1 * | 9/2010 | King et al. | 348/14.09 |
| 2012/0050323 A1 * | 3/2012 | Baron et al. | 345/632 |
| 2012/0147121 A1 * | 6/2012 | Erb et al. | 348/14.01 |
| 2012/0327172 A1 * | 12/2012 | El-Saban et al. | 348/14.02 |
| 2013/0088562 A1 * | 4/2013 | Hong et al. | 348/14.07 |
| 2013/0222681 A1 * | 8/2013 | Wan | 348/371 |

* cited by examiner

*Primary Examiner* — Hemant Patel
(74) *Attorney, Agent, or Firm* — Guntin & Gust, PLC; Douglas Schnabel

(57) ABSTRACT

A method that incorporates teachings of the subject disclosure may include, for example, utilizing a system including at least one processor for determining a video modification plan for a received video stream of a video call session according to the at least one party associated with the video call session, modifying, by the system, a plurality of background images of the received video stream according to the video modification plan to generate a plurality of modified background images, and generating, by the system, a modified video stream according to the plurality of modified background images. Other embodiments are disclosed.

20 Claims, 8 Drawing Sheets

600

700

800

900

APPARATUS AND METHOD FOR MODIFICATION OF TELECOMMUNICATION VIDEO CONTENT

FIELD OF THE DISCLOSURE

The subject disclosure relates generally to a video stream and more specifically to an apparatus and method for modifying a telecommunication video content.

BACKGROUND

Modern communication networks benefit from interconnectivity between consumers and various communication devices. As network capabilities expand, these interconnections provide new opportunities to enhance abilities for consumers to experience content. Telecommunication techniques allow consumers to communicate with one another using a variety of media, including voice, text, and video. Video content is frequently experienced via devices such as phone, computers, televisions, and mobile electronics. Manipulation of content can allow consumers to experience unique telecommunication experiences.

BRIEF DESCRIPTION OF THE DRAWINGS

Reference will now be made to the accompanying drawings, which are not necessarily drawn to scale, and wherein.

DETAILED DESCRIPTION

Figure 1:
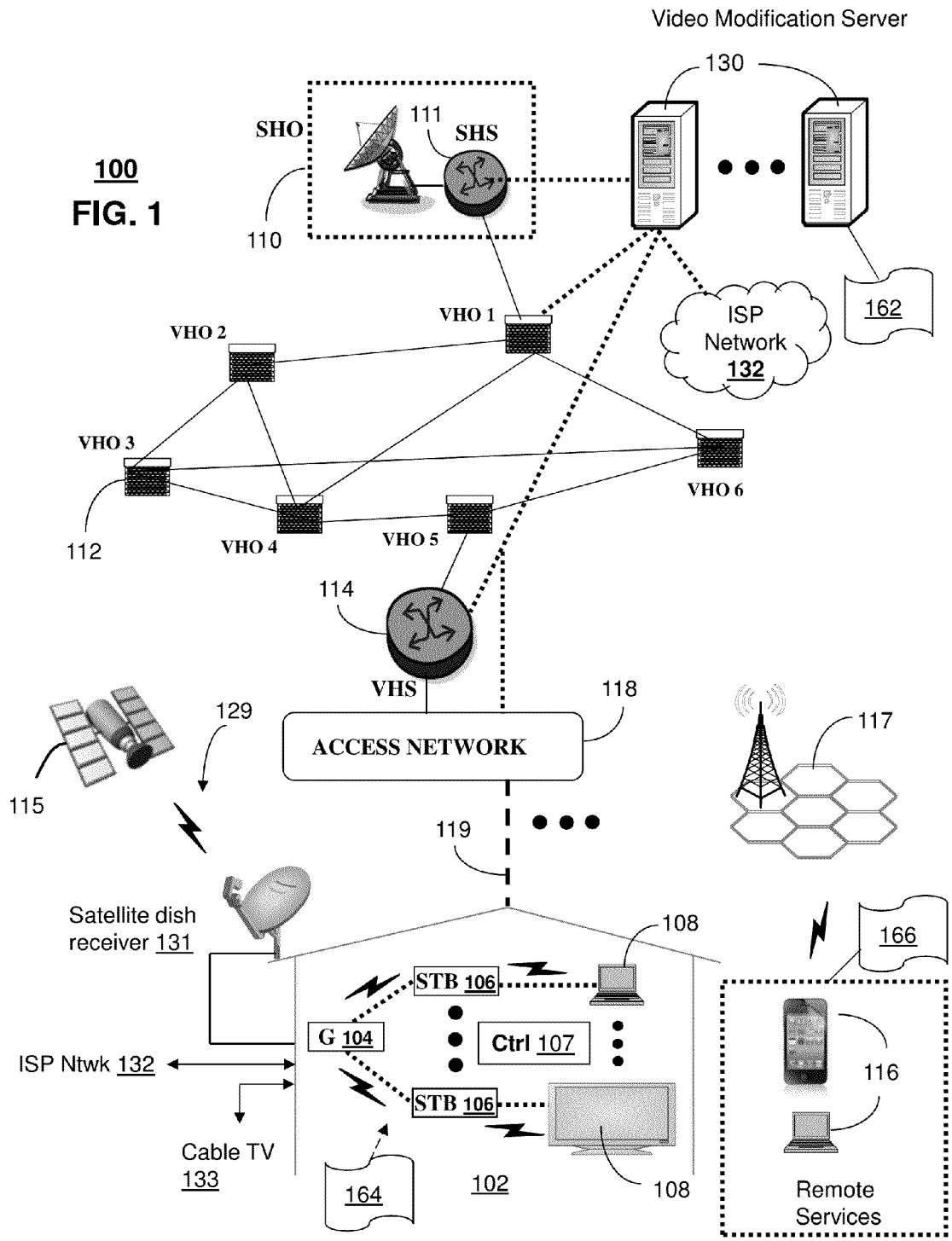
FIGS. 1-2 depict illustrative embodiments of communication systems that provide media services.

The subject disclosure describes, among other things, illustrative embodiments of an apparatus and a method of modifying telecommunication content, where a call video stream can be segmented into foreground and background images, and the foreground and/or background images can be replaced. Other embodiments are described by the subject disclosure.

One embodiment of the subject disclosure includes a device including a memory storing computer instructions and a processor coupled to the memory. The processor can perform operations responsive to executing the computer instructions including receiving a video stream associated with a video call session. The processor can perform operations for identifying at least one party to the video call session according to an indicator associated with the video call session and for determining a video modification plan for the received video stream according to the at least one identified party associated with the video modification plan. The processor can further perform operations for segmenting a plurality of video images of the received video stream into a plurality of foreground images and a plurality of background images according to the video modification plan. The processor can also perform operations for modifying the plurality of background images according to the video modification plan to generate a plurality of modified background images. In turn, the processor can perform operations for replacing the plurality of background images with the plurality of modified background images to generate a modified video stream and presenting the modified video stream at a display.

One embodiment of the subject disclosure includes a computer-readable storage medium including computer instructions, which, responsive to being executed by at least one processor, can cause the at least one processor to perform operations including receiving a video stream captured at a first communication device associated with a video call session. The computer instructions can cause the at least one processor to perform operations for segmenting a plurality of video images of the received video stream into a plurality of foreground images and a plurality of background images according to a video modification plan. The computer instructions can cause the at least one processor to perform operations for modifying at least one of the plurality of background images or the plurality of foreground images according to the video modification plan to generate a plurality of modified background images or a plurality of modified foreground images. In turn, the computer instructions can cause the at least one processor to perform operations for replacing at least one of the plurality of background images or the plurality of foreground images with the plurality of modified background images, the plurality of modified foreground images, or the combination thereof, to generate a modified video stream. The computer instructions can further cause the at least one processor to perform operations for transmitting the modified video stream to a second communication device associated with the video call session.

One embodiment of the subject disclosure includes a method including utilizing a system including at least one processor for determining a video modification plan for a received video stream of a video call session according to the at least one party associated with the video call session. The method also can include utilizing the system for modifying a plurality of background images of the received video stream according to the video modification plan to generate a plurality of modified background images. The method can further include utilizing the system for including the plurality of modified background images in the received video stream to generate a modified video stream.

FIG. 1 depicts an illustrative embodiment of a first communication system 100 for delivering media content. The communication system 100 can represent an Internet Protocol Television (IPTV) media system. Communication system 100 can also provide for any of, any portion of, or all of the computing devices 130 to function as a video modification server (herein referred to as modification server 130). The modification server 130 can use computing and communication technology to perform function 162, which can include among things, receiving a video stream from a communication device associated with a video call session. The modification server 130 can determine a video modification plan for the received video stream by identifying one or more of the parties to the video call session. The modification server 130 can segment video images of the received video stream into foreground images and background images according to the video modification plan. The modification server 130 can modify background images and/or foreground images according the video modification plan to generate a plurality of modified background images and/or a plurality of modified foreground images. In turn, the modification server 130 can replace background images and/or foreground images with modified background images and/or modified foreground images to generate a modified video stream. The modification server 130 can then transmit the modified video stream to another communication device associated with the video call session. Media processors 106 and wireless communication devices 116 can be adapted with software functions 164 and 166, respectively, to utilize the services of modification server 130.

The IPTV media system can include a super head-end office (SHO) 110 with at least one super head-end office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and the media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The subject disclosure can apply to other present or next generation over-the-air and/or landline media content services system. Some of the network elements of the IPTV media system can be coupled to one or more computing devices, including but not limited to the video modification server 130, a portion of which can operate as a web server for providing web portal services over an Internet Service Provider (ISP) network 132 to wireline media devices 108 or wireless communication devices 116.

In further embodiments, multiple forms of media services can be offered to media devices over landline technologies such as those described above. Additionally, media services can be offered to media devices by way of a wireless access base station 117 operating according to wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies can be incorporated according to embodiments of the subject disclosure.

Figure 2:
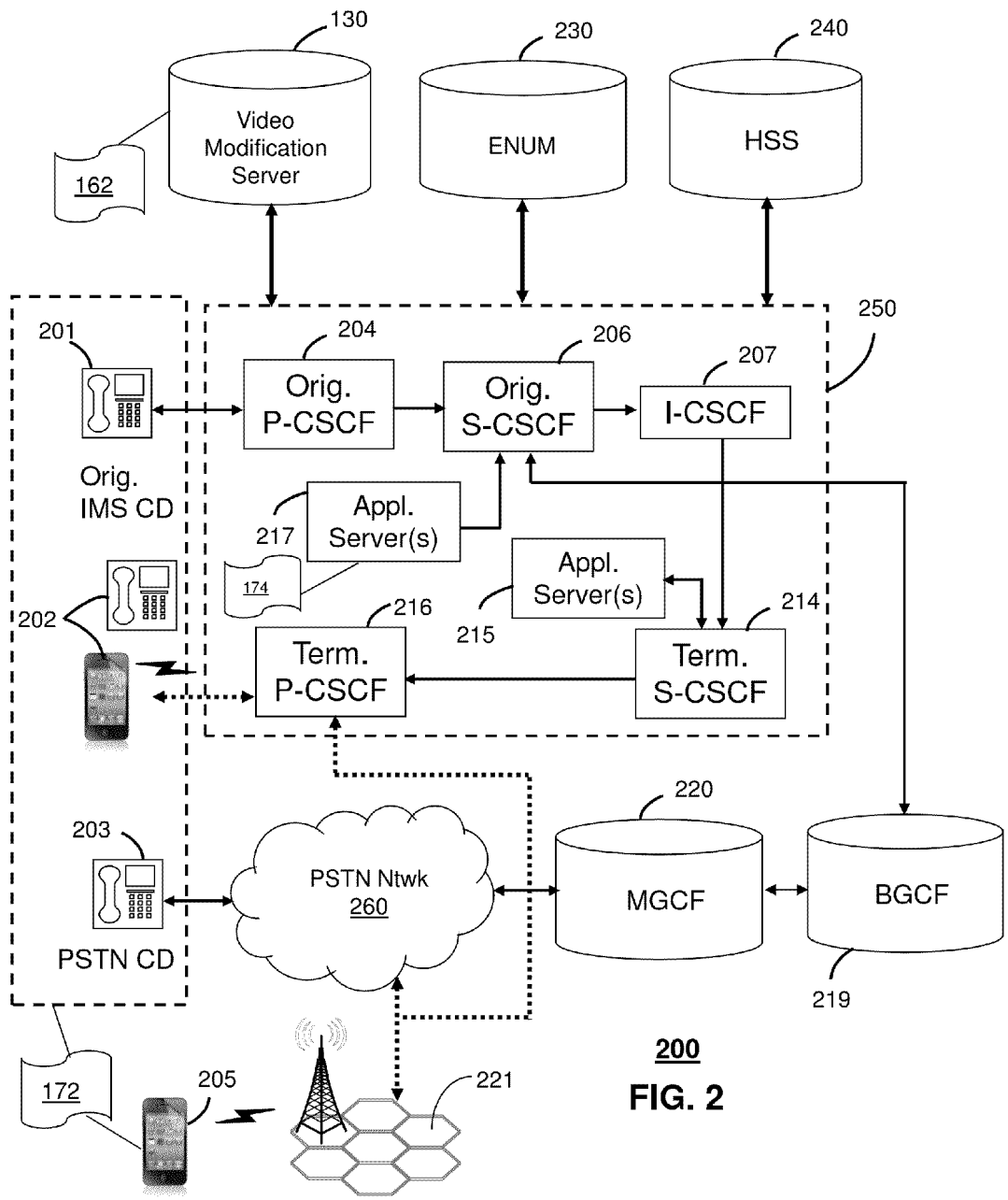

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with the communication system 100 as another representative embodiment of the communication system 100.

Communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The modification server 130 of FIG. 1 can be operably coupled to the second communication system 200 for modification of video associated with a video call session. In several embodiments of the subject disclosure, the modification server 130 can perform function 162 to thereby provide video modification services to the CDs 201, 202, 203 and 205 of FIG. 2. CDs 201, 202, 203 and 205, which can be adapted with software to perform function 172 to utilize the services of the modification server 130. It is further contemplated that the modification server 130 can be an integral part of the application server(s) 217 performing function 174, which can be substantially similar to function 162 and adapted to the operations of the IMS network 250.

Figure 3:
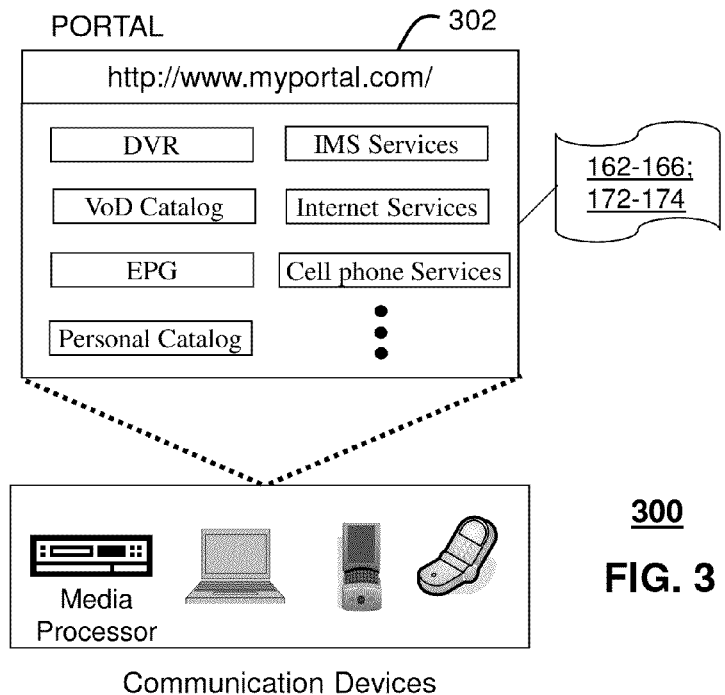
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices, including, but not limited to, the video modification server 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174, such as transmitting and/or receiving streamed media content, and to adapt these applications as may be desired by subscribers and service providers of communication systems 100-200.

Figure 4:
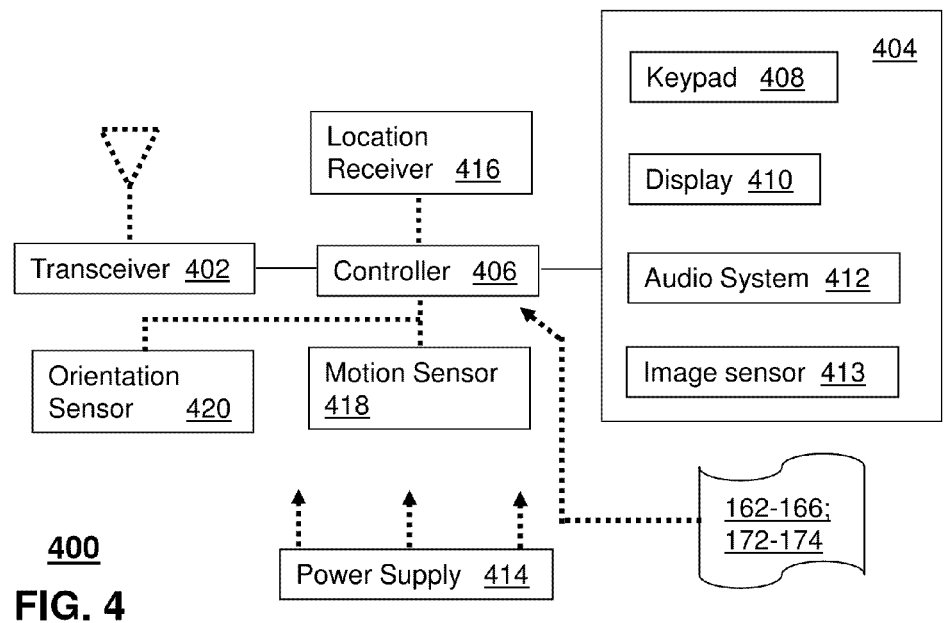
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/

EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP. VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements. In one embodiment, the display 410 can be capable of presenting a two-dimensional image. In another embodiment, the display 410 can be capable of reproducing three dimensional images.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications.

The UI 404 can further include an image sensor 413, such as a charged coupled device (CCD) camera for capturing still or moving images. In one embodiment, the image sensor 413 can include a single image camera. In one embodiment, the image sensor 413 can be capable of capturing multiple images, such as a camera with stereo image or three-dimensional input capture capabilities.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, such as transmitting and/or receiving streamed media content.

Figure 5:
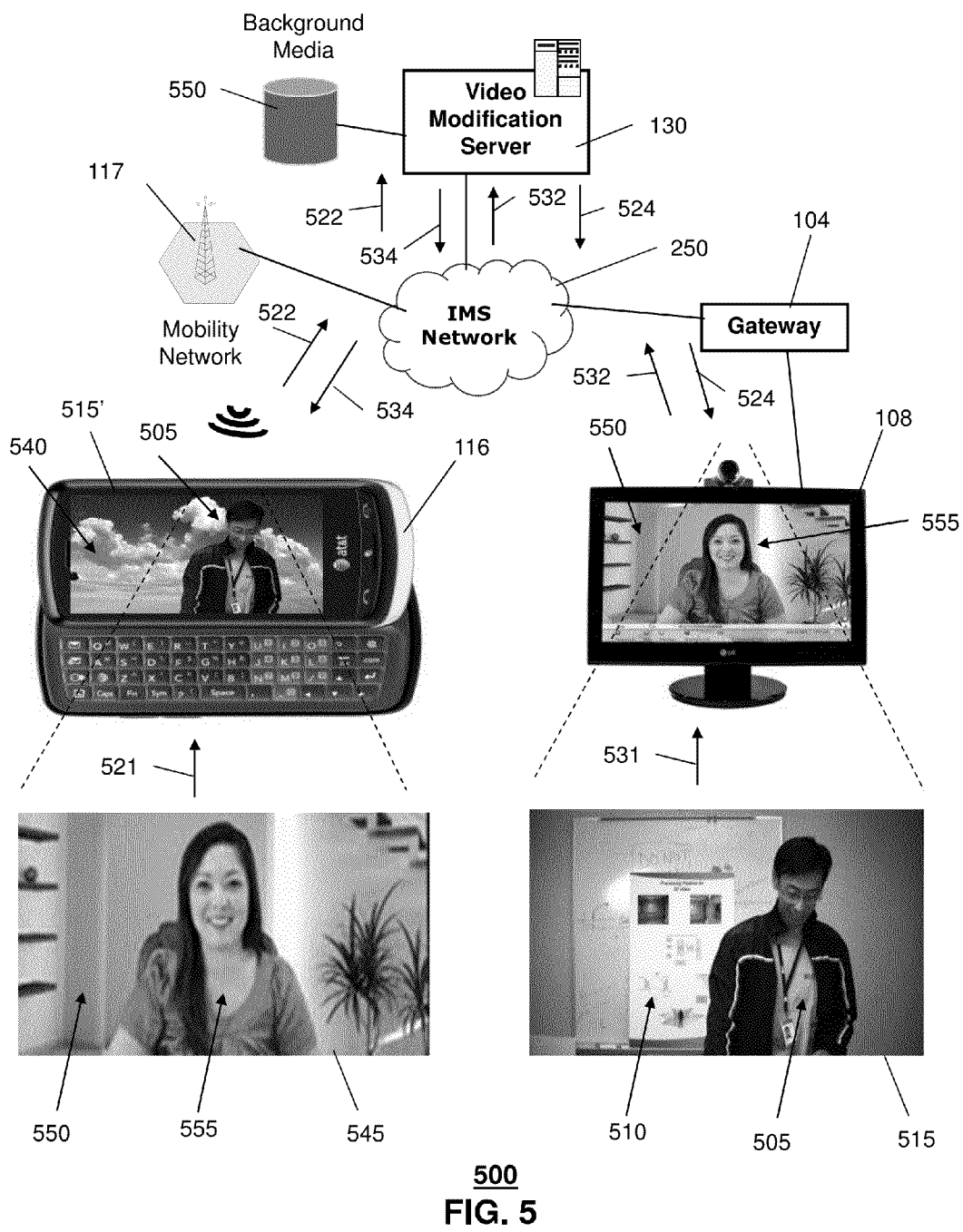
FIG. 5 depicts an illustrative embodiment of a communication system that performs segmentation and replacement of video images for video call stream.

FIG. 5 depicts an illustrative embodiment of a communication system 500 that can perform segmentation and replacement of video images from a video stream of a video call session. System 500 can be overlaid or operably coupled to communication systems 100-200 as another representative embodiment of communication systems 100-200. System 500 can include a modification server 130 in communication with a packet switched network such as IMS network 250. The IMS network 250 can be in communication with a wireless communication device 116, such as a mobile phone, by way of a mobility network 117 that can include cellular base stations. IMS network 250 can also be in communication with a media device 108, such as a television, by way of a gateway device 104. While the communication system is illustrated with a wireless communication device 116 and a media device 108, other devices that are capable of bi-directional video communications can be used for implementing a video call session.

In one embodiment, the wireless communication device 116 and the media device 108 can each include capability to perform bi-directional communication of audio and video. For example, the wireless communication device 116 can include a video camera and a microphone to capture video and audio data 521 of a first party 555, who is using the wireless communication device 555 in a video call session. Similarly, the media device 108 can include a video camera and a microphone to capture video and audio data 531 of a second party 505 to the video call session. In one embodiment, the wireless communication device 116 and the media device 108 can each include an audio system and video display for reproduction of audio and video signals into sound and images.

In one embodiment, a video call session can be established between wireless communication device 116 and the media device 108. For example, a first party 555 operating the wireless communication device 116 can initiate a video call with a second party 505 operating the media device 108 by dialing a telephone number of the media device 108. The IMS network 250 can convert the telephone number into an internet protocol (IP) address for the media device 108 and can complete a connection between the wireless communication device 116 and the media device 108 by way of an IP communication session. Once a video call session is established between the two devices 108 and 116, a communications channel can be established for exchanging audio and video information between the devices. In one embodiment, audio and video information is exchanged between the devices 108 and 116 by transmitting and receiving video streams. For example, during the video call session, the wireless communication device 116 can capture video and audio data 521 of the first party 555. The wireless communication device 116 can encode and transmit this captured information as a first video stream 522. Similarly, in one embodiment, the media device 108 can capture video and audio data 531 of the second party 505 and can encode and transmit this captured information as a second video stream 532.

In one embodiment, the wireless communication device 116 can transmit the first video stream 522 wirelessly over the mobility network 117, through the IMS network 250, and the gateway 104 to the video modification server 130. The video modification server 130 can generate a first modified video stream 524 from the first video stream 522. The video modification server 130 can send the first modified video stream 524 through the IMS network 250 to the media device 108. In one embodiment, the media device 108 can transmit the second video stream 532 through the IMS network 250 to the video modification server 130. The video modification server 130 can generate a second modified video stream 534 from the second video stream 532. The video modification server 130 can send the second modified video stream 534 through the IMS network 250 to the wireless communication device 116.

The media device 108 can receive the first video stream, process the received stream by decoding video images and sound, and then reproduce the decoded images and sounds for presentation at a display and speakers of the media device 108. Similarly, the wireless communication device 116 can receive the second video stream, decode its contents, and reproduce video and audio. For example, during a video call session between the wireless communication device 116 and the media device 108, images of the first party 555 can be captured at the wireless communication device 116 and then displayed on the media device 108.

In one embodiment, the modification server 130 can detect a video call session between two or more devices. For example, the video call session can include a first device 108, such as the media device 108 and a second device 116, such as the wireless communication device 116. In one embodiment, a video call session can include more than two devices with more than two parties. The modification server 130 can identify one or more of the parties associated with the call session. In one embodiment, the modification server 130 can detect an indicator associated with the call session and can use this indicator to determine one or more identities of parties. For example, a first party 555 can be a subscriber who is associated with the wireless communication device 116. In one embodiment, a subscriber can be associated with a device via a long term arrangement, such as would be the case for a subscriber and a wireless communication device 116, where the subscriber has contractual arrangement to use the device over the IMS network 250. In one embodiment, a subscriber can be associated with a device via a short term arrangement, such as would be the case if the subscriber were merely logged into a computer device that was used in a video call session. In one embodiment, the modification server 130 can determine an identity of a party to a call using an indicator, such as a telephone number, an internet protocol (IP) address, a universal resource indicator (URI).

In one embodiment, the modification server 130 can determine a video modification plan from the identities of one or more of the parties to the video call session. In one embodiment, a video modification plan can be determined from a database associated with one of the parties to the video call. In one embodiment, a first device, such as the wireless communication device 116, can include a database, such as an electronic phone book, that is stored or otherwise accessible from the device 116. In one embodiment, a subscriber 555, such as the subscriber 555 of the first device 108, can access a set of video modification plans as a feature of an electronic phone book. For example, an electronic phone book can allow the subscriber 555 to associate specific video modification plans with specific, identified callers. For example, a first subscriber 555 can associate a specific video modification plan with a second subscriber 505 by an electronic phone book in the first device 108 or by an electronic phone book accessible over the IMS network 250. In one embodiment, a video modification plan can specify that a particular video image or series of video images be presented on a display of a first device 116 whenever a second subscriber 505, or a second device 108 associated with the second subscriber 505, calls the first device 116. For example, the modification server 130 can detect a video call and determine that the parties to the call are a first subscriber 555 associated with a first device 116 and second subscriber 505 associated with a second device 108. The modification server 130 can, in turn, select a first video modification plan for the first device 116 by interrogating an electronic phone book at the first device 116 or associated with the first device 116. In another embodiment, the steps of detecting the video call, determining the identity of a party to the call, and/or determining the video modification plan can be performed by either calling device 116, 108 or by the video modification server 130.

In one embodiment, the modification server 130 can receive video streams 522, 532 from any device 108, 116 associated with a detected video call. In one embodiment, the modification server 130 can segment video images of the received video streams 522, 532 into foreground images and background images according to a video modification plan. In one embodiment, segmentation can include analyzing the video content of the video stream to detect a contour body, or more than one contour body, consistent with one or more foreground images in the image data. In one embodiment, the modification server 130 can perform video processing to detect foreground images in the video data. For example, the modification server 130 can detect portions of the video image that correspond to foreground images of one or more people participating in the video call. Conversely, the modification server 130 can detect other portions of the video image that correspond to background images, such as static objects, furniture, or walls.

In one embodiment, foreground images can be replaced via alpha compositing or alpha matting. In one embodiment, individual pixels of images of the video stream can include alpha channel information to distinguish the pixel image coverage capability over a range from transparent to opaque. In one embodiment, the alpha channel information can be used in video processing operations for combining foreground images and background images via compositing logical algebraic operations. For example, identified foreground and background images can be overlayed such that the foreground image covers the background image, the background image coves the foreground image, or a blending of the images occurs according to the alpha channel information and the combining algorithm.

Figure 6:
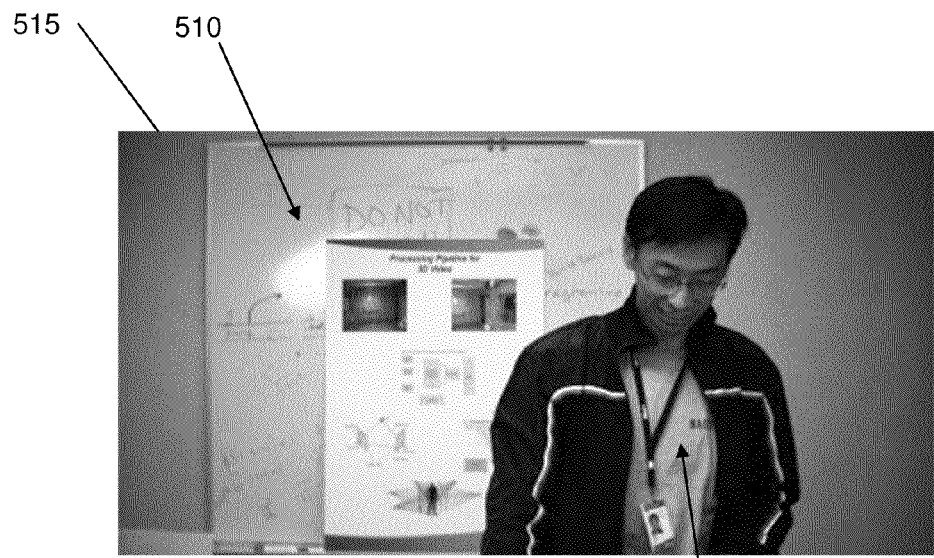
FIGS. 6-9 depict illustrative embodiments of segmentation and replacement of video images in a video call stream via the communication systems of FIGS. 1-4.
Figure 7:
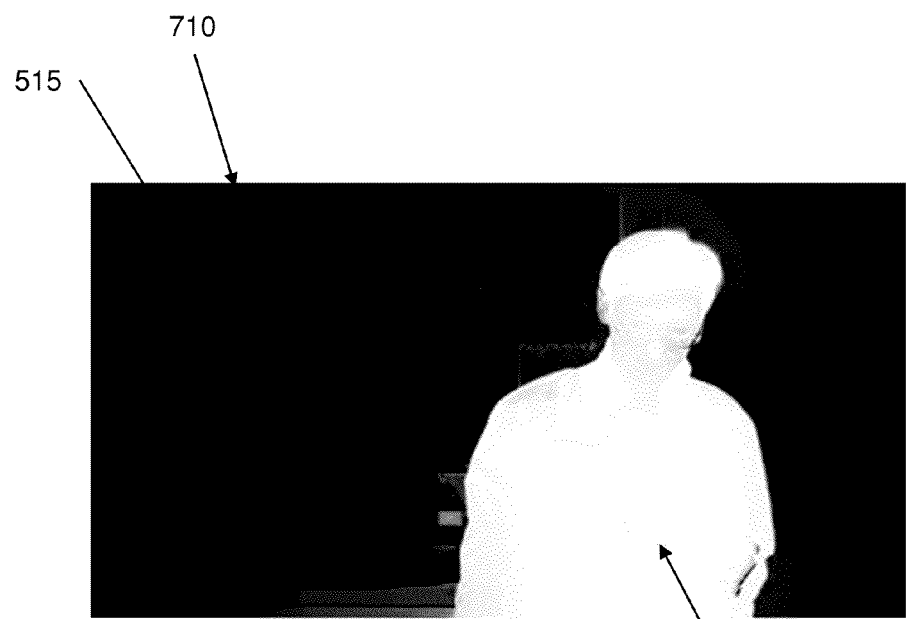
Figure 8:

FIGS. 6-9 depict illustrative embodiments of segmentation and replacement of video images in a video call stream via the communication systems of FIGS. 1-5. For example, FIG. 6 illustrates an exemplary image video frame 515 captured by a camera of the media processor 108. In the image video frame 515, a participant 505 in a video call is shown standing in front of a wall and presentation board. As shown in FIG. 7, the modification server 130 can segment the image video frame 515 into portions containing foreground images 705, shown as an outline of the participant, and portions containing background images 710, shown as a darkened area.

Figure 9:

In one embodiment, the modification server 130 can modify the background images 710 and/or foreground images 705 that have been detected. In one embodiment, the modification server 130 can base the modification of the detected background image 710 and/or foreground images 705 according to the video modification plan. In one embodiment, the modification server 130 can modify either the identified background images 710 or the identified foreground images 705 to generate modified background images or modified foreground images. In one embodiment, the modification server 130 can replace identified foreground images 705 or background images 710. For example, in FIG. 8, a replacement background image 540 is illustrated. In FIG. 9, the identified background image 710 is replaced with the replacement background image 540. By segmenting the original video image 510 into foreground images 505 and background images 710, the modification server 130 can identify pixels of the video image that can be replaced with the selected replacement background and pixels that can maintain their foreground image data. As a result, the modification server 130 can generate a modified video image 515' with the original foreground image 505 and a replacement background image 540. In one embodiment, the process of segmentation and replacement can be repeated for other images from the video stream. In one embodiment, every video image, or frame, in a received video stream is subject to segmentation and replacement by the modification server 130. In one embodiment, only a portion of the video images or only a portion of each video image is subject to segmentation and replacement. For example, the modification server 130 can be directed by the video modification plan to only apply segmentation and replacement to an area of each image, or frame, such as only the left side, or only apply the method to a specified number of seconds of the video call session.

In one embodiment, the modification server 130 can transmit the modified video stream to one of the devices 108, 116 associated with the video call session. In one embodiment, a video stream can be captured from a second device 116 and subjected to segmentation and replacement via the video modification server 130. The video modification server 130 can then transmit the modified video stream to the first device 108 of the call session for presentation of the modified images 515' at a display of the first device 108. In one embodiment, the reception of the captured video stream and the segmentation and replacement of video images can be performed at any or any combination of the devices 108, 116 participating in the video call session or the modification server 130. For example, the video stream captured from the second device 116 can be subjected to segmentation and replacement at the second device 116 (originating device) or at the first device (terminating device) 116, In one embodiment, a subscriber can select a replacement image 540 from a set of images provided at a device 108, 116, at the IMS network 250, at a portal 400, or at the modification server 130. In one embodiment, replacement images 540 can be downloaded to a device 108, 116 or can be stored at the modification server 130 on behalf of a subscriber or device. In various embodiments, the replacement image 540 can be a recorded video, a live video feed, a still image, a screen-captured image from a video, or a graphically designed or altered image. In one embodiment, modified images only appear at devices other than a device where the video image was captured. For example, the modified image 540 derived from the captured video stream at the second device 116 can only be viewed at the first device 108 or any other device that is part of the video call session. In one embodiment, the modified images 540 can also be viewed at the video capturing device 108. In one embodiment, the modified image 540 can only appear at one device, such as only at the first device 108, because the subscriber for the first device 108 has specifically selected the replacement image 515' as a means of video identification of the other party.

In one embodiment, a subscriber can select a video modification plan from a set of video modification plans resident at the IMS network, the modification server 130, a device 108, 116, or a computing cloud. In one embodiment, subscriber devices 108, 116 can share video modification plans with one another. In one embodiment, a background image 510 or foreground image 505 can be modified rather than replaced. For example, a background image 510 can be modified to "blank" a busy background to a single color, such as modifying the background image 510 to a "green screen" or to blackout. For example, a background image 510 can be changed from a color image to a black-and-white image or from a black-and-white image to a color image. Similarly, the lighting in the background image can be changed from bright to dim lighting or from dim to bright lighting. In one embodiment, a background image 515 and/or a foreground image can be modified to correspond to a time of day, a day of week, a season, or a location of any of the parties of the video call. For example, the conditions at the location of the second device 116 can be reflected in the background image or the replacement background image of the modified video stream. For example, if it is raining at the location of second device 116, then the replacement background image 540 for the second party 505 could be modified by adding raindrops or can be replaced altogether with an image of a rainy day. In one embodiment, a replacement background image 540 or replacement foreground image can be modified after replacement.

In one embodiment, metadata can be added to the modified video data stream. In one embodiment, metadata can be associated with any of the parties to the video call. For example, the second device 116 can include metadata information about the second device 116 or the second subscriber 505 with its generated data stream. This metadata can be included with the modified video images of the modified video stream. In another embodiment, metadata can be obtained as part of a replacement image. For example, the first device 108 or the second device 116 can obtain the replacement image 540 from a source, such as a website, and can further obtain metadata associated with the replacement image 540. In one embodiment, the metadata can include an IP address or email address.

In one embodiment, the modified video stream can include advertising information. For example, the replacement video data can include logos or a streaming advertisement. In one embodiment, the modified video stream can include modified audio. For example, audio data can be obtained by the modification server 130 or by any of the devices 108, 116 of the video call session. In one embodiment, the replacement audio can be used as a form of caller-identification. In one embodiment, the foreground image 505 can be replaced with an avatar image that tracks the movements of the foreground image 505.

The media processors 106 and wireless communication devices 116 can be adapted with software functions 164 and 166, respectively, to utilize the services of modification server 130.

Figure 10:
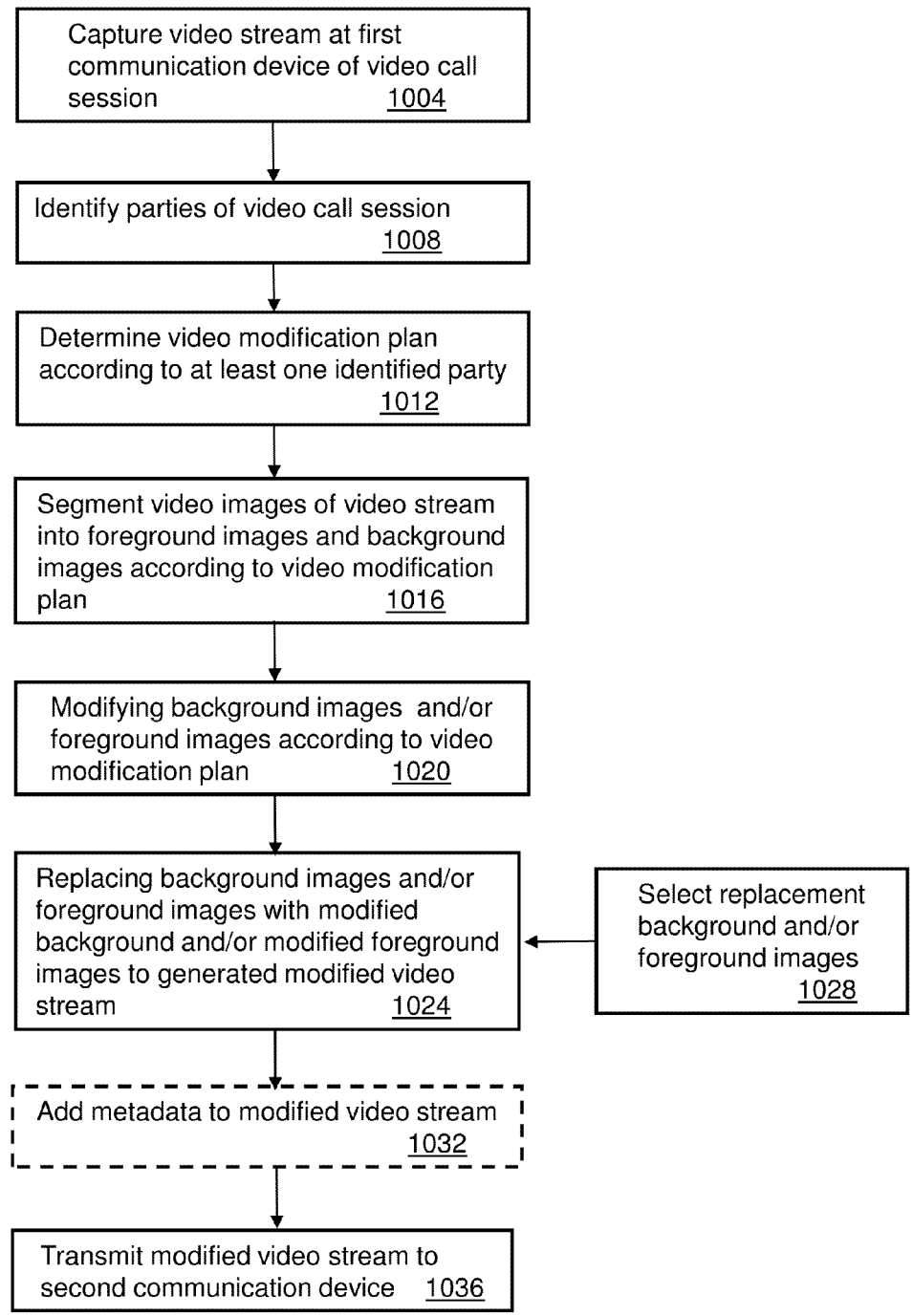
FIG. 10 depicts an illustrative embodiment of a method operating in portions of the systems described in FIGS. 1-4.

FIG. 10 depicts an illustrative method 1000 that operates in portions of the systems and devices of FIGS. 1-5. Method 1000 can begin with step 1004 in which a video stream is captured at a first communication device of a video call session. In step 1008, the parties of the video call session can be identified. In step 1012, a video modification plan can be determined based on one or more of the identified parties to the video call session.

In step 1016, video images of the captured video stream can be segmented into foreground images and background images according to the video modification plan. In step 1020, the background images and/or foreground images can be modified according the video modification plan. In step 1024, the background images and/or foreground images can be replaced with the modified background images and/or modified foreground images to generate a modified video stream. In step 1028, replacement background and/or foreground images can be selected. In step 1032, metadata can be added to the modified data stream. In step 1036, the modified video stream can be transmitted to the second device 116.

Upon reviewing the aforementioned embodiments, it would be evident to an artisan with ordinary skill in the art that said embodiments can be modified, reduced, or enhanced without departing from the scope and spirit of the claims described below.

Figure 11:
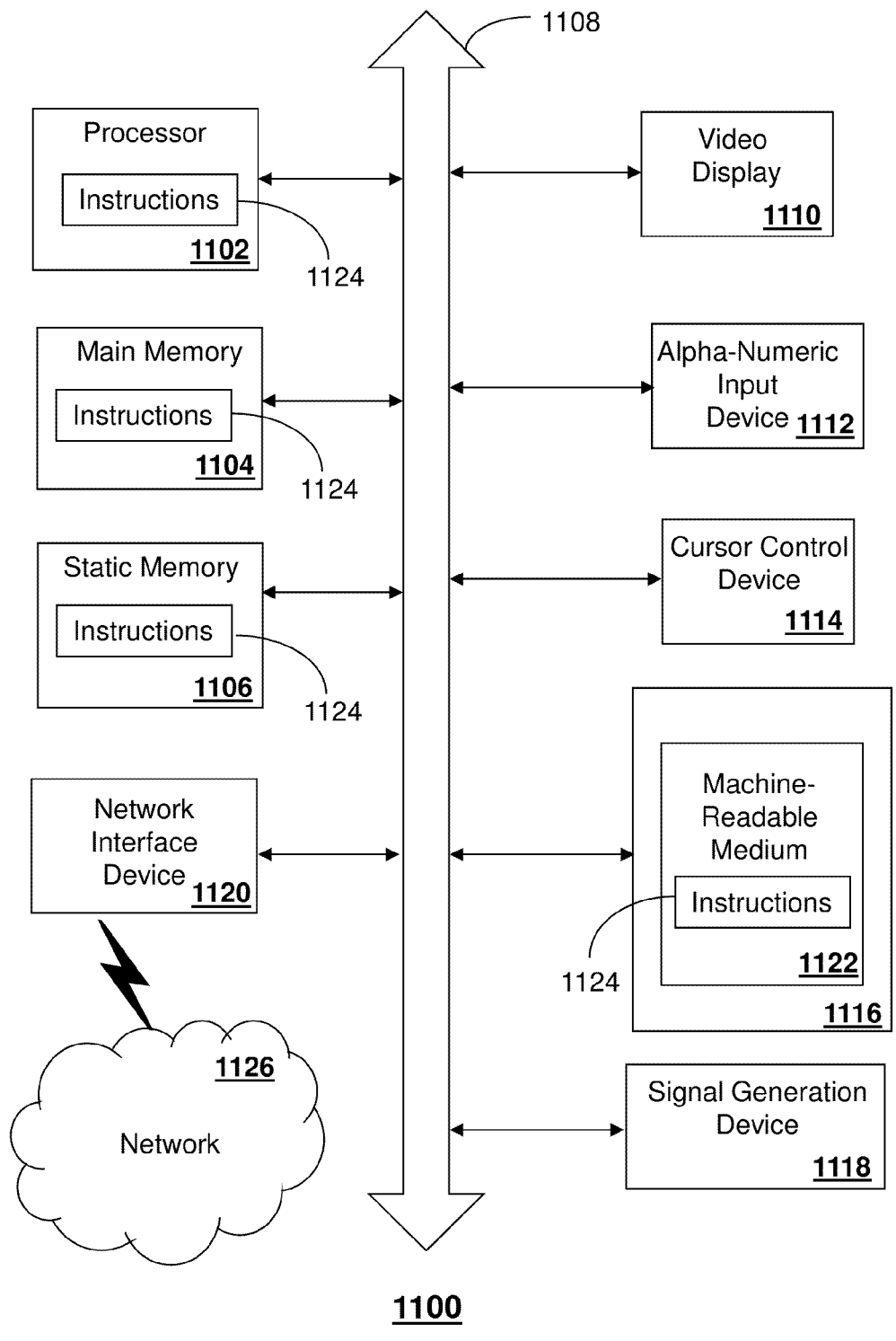
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods discussed above. One or more instances of the machine can operate, for example, as the modification server 130, the media processor 106, and/or the mobile communication device 116, and/or other devices of FIGS. 1-5. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, or a solid state display. The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a memory storing computer instructions; and
   a processor coupled to the memory, wherein the processor, responsive to executing the computer instructions, performs operations comprising:
      receiving a video stream associated with a video call session;
      identifying one party to the video call session according to an indicator associated with the video call session;
      determining a video modification plan for the video stream according to the one party associated with the video modification plan;
      segmenting a plurality of video images of the video stream into a plurality of foreground images and a plurality of background images according to the video modification plan;
      modifying the plurality of foreground images according to the video modification to generate a plurality of modified foreground images, wherein one foreground image of the plurality of foreground images is replaced with an avatar in the plurality of modified foreground images;
      modifying the plurality of background images according to the video modification plan to generate a plurality of modified background images; and
      replacing the plurality of background images with the plurality of modified background images and the plurality of foreground images with the plurality of modified foreground images to generate a modified video stream that can be presented at a display.

2. The device of claim 1, wherein the modified video stream comprises an advertisement.

3. The device of claim 1, wherein the video stream is captured at a communication device that is associated with the one party.

4. The device of claim 1, wherein the indicator associated with the video call session comprises one of a telephone universal resource identifier, a telephone number, metadata associated with the video stream, or any combination thereof.

5. The device of claim 1, wherein the processor, responsive to executing the computer instructions, performs operations comprising:
   requesting the video modification plan from a database comprising a plurality of video modification plans according to the indicator associated with the video call session; and
   receiving the video modification plan from the database.

6. The device of claim 5, wherein the database comprises an electronic phone book.

7. The device of claim 1, wherein the plurality of foreground images are modified according to one of a location, a time of day, a weekday, a date, an activity, a characteristic, or any combination thereof, associated with the one party.

8. The device of claim 1, wherein the processor, responsive to executing the computer instructions, performs operations comprising attaching metadata to the modified video stream, wherein the metadata is associated with one of the one party, the plurality of modified background images, the plurality of modified foreground images, or any combination thereof.

9. The device of claim 1, wherein the processor, responsive to executing the computer instructions, performs operations comprising transmitting the modified video stream to a communication device.

10. The device of claim 1, wherein the plurality of modified background images comprises one of recorded video, live video, still images, images of captured video, or any combination thereof.

11. A computer-readable storage medium, comprising computer instructions, which, responsive to being executed by a processor, cause the processor to perform operations comprising:
- receiving a video stream captured at a first communication device associated with a video call session;
- segmenting a plurality of video images of the video stream into a plurality of foreground images and a plurality of background images according to a video modification plan;
- modifying the plurality of foreground images according to the video modification plan to generate a plurality of modified foreground images, wherein one foreground image of the plurality of foreground images is replaced with an avatar in the plurality of modified foreground images;
- replacing the plurality of foreground images with, the plurality of modified foreground images to generate a modified video stream; and
- transmitting the modified video stream to a second communication device associated with the video call session.

12. The computer-readable storage medium of claim 11, comprising computer instructions which, when executed by the processor, cause the processor to perform operations comprising:
- identifying one party to the video call session according to an indicator associated with the video call session; and
- determining the video modification plan for the video stream according to the one party associated with the video modification plan.

13. The computer-readable storage medium of claim 12, wherein the indicator associated with the video call session comprises one of a telephone universal resource identifier, a telephone number, metadata associated with the video stream, or any combination thereof.

14. The computer-readable storage medium of claim 12, comprising computer instructions which, when executed by the processor, cause the processor to perform operations comprising:
- requesting the video modification plan from an electronic phone book associated with the second communication device according to the indicator associated with the video call session; and
- receiving the video modification plan from the electronic phone book.

15. The computer-readable storage medium of claim 12, comprising computer instructions which, when executed by the processor, cause the processor to perform operations comprising attaching metadata to the modified video stream, wherein the metadata is associated with one of the one party, the plurality of modified foreground images, or a combination thereof.

16. A method, comprising:
- determining, by a system including a processor, a video modification plan for a received video stream of a video call session, wherein the video modification plan is determined according to one party associated with the video call session;
- modifying, by the system, a plurality of background images of the received video stream and a plurality of foreground images according to the video modification plan to generate a plurality of modified background images and a plurality of modified foreground images, wherein one foreground image of the plurality of foreground images is replaced with an avatar in the plurality of modified foreground images; and
- generating, by the system, a modified video stream according to the plurality of modified background images and the plurality of modified foreground images.

17. The method of claim 16, comprising identifying, by the system, the one party according to an indicator associated with the video call session comprising one of a telephone universal resource identifier, a telephone number, metadata associated with the received video stream, or any combination thereof.

18. The method of claim 16, comprising:
- requesting, by the system, the video modification plan from an electronic phone book comprising a plurality of video modification plans according to an indicator associated with the video call session; and
- receiving, by the system, the video modification plan from the electronic phone book.

19. The method of claim 16, comprising transmitting, by the system, the modified video stream to a communication device associated with the video call session.

20. The method of claim 16, comprising attaching, by the system, metadata to the modified video stream, wherein the metadata is associated with one of the one party, the plurality of modified background images, the plurality of modified foreground images, or any combination thereof.

\* \* \* \* \*